United States Patent
Komaki et al.

(10) Patent No.: US 8,951,475 B2
(45) Date of Patent: Feb. 10, 2015

(54) CHEMICAL HEAT ACCUMULATOR

(75) Inventors: Katsuya Komaki, Kariya (JP); Hiroshi Mieda, Kariya (JP); Tadahiro Nakagawa, Nisshin (JP); Takashi Shimazu, Nagoya (JP); Tomohisa Wakasugi, Toyota (JP); Hiroyuki Mitsui, Nagoya (JP); Hideo Sobukawa, Nisshin (JP)

(73) Assignee: Denso Corporation, Kariya (JP)

( * ) Notice: Subject to any disclaimer, the term of this patent is extended or adjusted under 35 U.S.C. 154(b) by 275 days.

(21) Appl. No.: 13/433,766

(22) Filed: Mar. 29, 2012

(65) Prior Publication Data
US 2012/0251394 A1 Oct. 4, 2012

(30) Foreign Application Priority Data

Mar. 31, 2011 (JP) ................. 2011-079727

(51) Int. Cl.
- *F28D 20/00* (2006.01)
- *G05D 23/00* (2006.01)
- *G05D 7/00* (2006.01)

(52) U.S. Cl.
CPC ............ *F28D 20/003* (2013.01); *Y02E 60/142* (2013.01)
USPC ........... 422/111; 422/175; 422/173; 422/631; 422/110; 422/162; 422/109; 165/104.12

(58) Field of Classification Search
CPC .................................................. F28D 20/003
USPC ...................... 422/175, 162, 631; 165/104.12
See application file for complete search history.

(56) References Cited

U.S. PATENT DOCUMENTS 5,653,106 A 8/1997 Katashiba et al.

FOREIGN PATENT DOCUMENTS

| JP | 2008-111592 | 5/2008 |
| JP | 2010-196974 | 9/2010 |
| JP | 2012-007822 | 1/2012 |

OTHER PUBLICATIONS

Office action dated Jun. 17, 2014 in corresponding Japanese Application No. 2011-079727.

*Primary Examiner* — Lessanework Seifu
(74) *Attorney, Agent, or Firm* — Harness, Dickey & Pierce, PLC

(57) ABSTRACT

A chemical heat accumulator includes a receptacle, a first reaction vessel, and a second reaction vessel. The first reaction vessel is hermetically connected to the receptacle and supplied with water from the receptacle. The first reaction vessel contains a chemical compound that causes a hydration reaction with the water from the receptacle to generate water vapor by a heat of reaction, and causes a dehydration reaction by receiving heat. The second reaction vessel is hermetically connected to the first reaction vessel and supplied with the water vapor from the first reaction vessel. The second reaction vessel contains a chemical heat storage material that generates heat by causing a hydration reaction with the water vapor from the first reaction vessel and stores heat through a dehydration reaction caused by receiving heat. The chemical heat storage material is thermally in contact with an object to be heated.

19 Claims, 12 Drawing Sheets

CHEMICAL HEAT ACCUMULATOR

CROSS REFERENCE TO RELATED APPLICATION

This application is based on Japanese Patent Application No. 2011-79727 filed on Mar. 31, 2011, the disclosure of which is incorporated herein by reference.

TECHNICAL FIELD

The present disclosure relates to a chemical heat accumulator.

BACKGROUND

For example, JP07-180539A, which corresponds to U.S. Pat. No. 5,653,106, describes a chemical heat accumulator having a reactor vessel filled with an alkali earth metal oxide and a water tank storing water. In the described chemical heat accumulator, the water is supplied from the water tank to the reactor vessel, and heat generated by a hydration reaction of the alkali earth metal oxide is used to heat an object.

SUMMARY

In such a chemical heat accumulator, it is difficult to generate heat having a high temperature by a hydration reaction of an alkali earth metal oxide.

In a case where the hydration reaction is carried out in a single reaction vessel, the water in the reaction vessel becomes a super critical fluid having a temperature of 400 degrees Celsius or more. Therefore, an internal pressure of a closed system extremely increases.

In a case where an object such as a catalyst is heated by heat of an exhaust gas that has passed through a reaction vessel, a heat exchange capacity is low and it is difficult to reduce the size of a chemical heat accumulator.

It is an object of the present disclosure to provide a chemical heat accumulator capable of generating heat having a high temperature, and capable of reducing an internal pressure of a closed system and a size thereof.

According to an aspect of the present disclosure, a chemical heat accumulator includes a receptacle that stores water therein, a first reaction vessel and a second reaction vessel. The first reaction vessel is hermetically connected to the receptacle and is supplied with the water from the receptacle. The first reaction vessel contains a chemical compound therein that causes a hydration reaction with the water from the receptacle to generate water vapor by a heat of reaction, and causes a dehydration reaction by receiving heat. The second reaction vessel is hermetically connected to the first reaction vessel and is supplied with the water vapor from the first reaction vessel. The second reaction vessel contains a chemical heat storage material that generates heat by causing a hydration reaction with the water vapor from the first reaction vessel and stores heat by causing a dehydration reaction by receiving heat. The chemical heat storage material is thermally in contact with an object to be heated.

In the above chemical heat accumulator, the chemical compound contained in the first reaction vessel generates heat by reacting with the water, and produces the water vapor. In the second reaction vessel, the chemical heat storage material causes the hydration reaction with the water vapor generated in the first reaction vessel to generate heat. In this way, since the heat is generated in two stages, such as in the first reaction vessel and the second reaction vessel, the heat having a higher temperature can be generated, as compared with a case where heat is generated by a hydration reaction in a single reaction vessel.

Further, the above chemical heat accumulator has the first reaction vessel and the second reaction vessel. In the first reaction vessel, the water vapor having a high pressure is generated. In the second reaction vessel, the hydration reaction is carried out between the water vapor and the chemical heat storage material. Therefore, an internal pressure of a hermetically closed system including the receptacle, the first reaction vessel and the second reaction vessel can be reduced.

In addition, in the second reaction vessel, the chemical heat storage material is thermally in contact with the object to be heated. Therefore, a heat exchanging capacity can be improved, as compared with a case where the heat generated by the chemical heat storage material is conducted to an object to be heated through gas. As such, the size of the chemical heat accumulator can be reduced.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

First Embodiment

A first embodiment will be described with reference to FIGS. 1 through 4.

Figure 1:
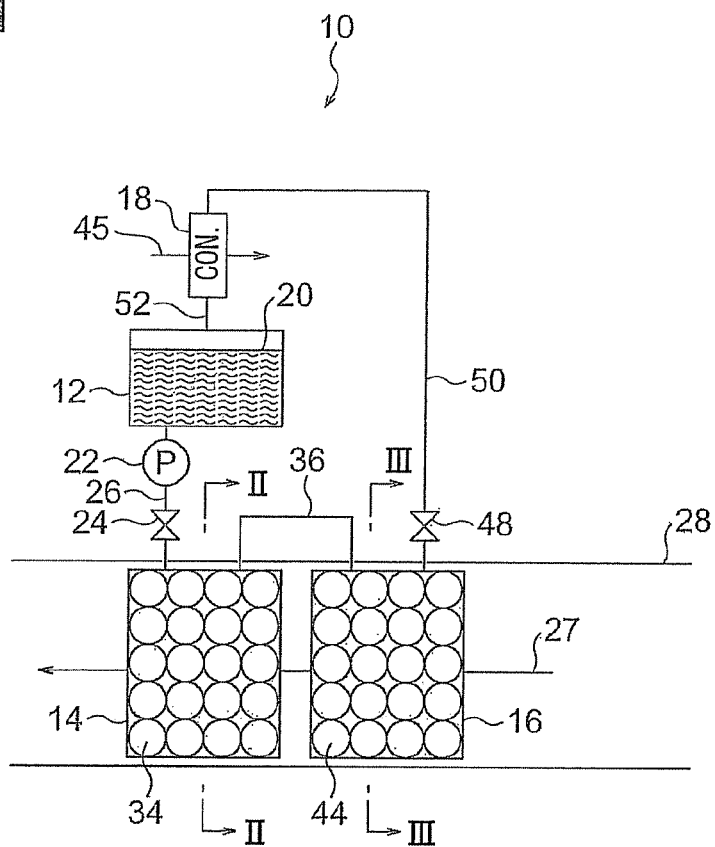
FIG. 1 is a diagram illustrating a schematic structure of a chemical heat accumulator according to a first embodiment.

As shown in FIG. 1, a chemical heat accumulator 10 according to the present embodiment generally includes a receptacle 12, a first reaction vessel 14, a second reaction vessel 16, and a condenser 18.

The receptacle 12 stores water therein. The first reaction vessel 14 is connected to the receptacle 12 through a pipe 26 in a hermetically sealed state. The pipe 26 is provided with a pump 22 and an on-off valve 24. The first reaction vessel 14 is disposed inside of an exhaust pipe 28 through which an exhaust gas 27 from an engine (not shown) flows.

Figure 2:
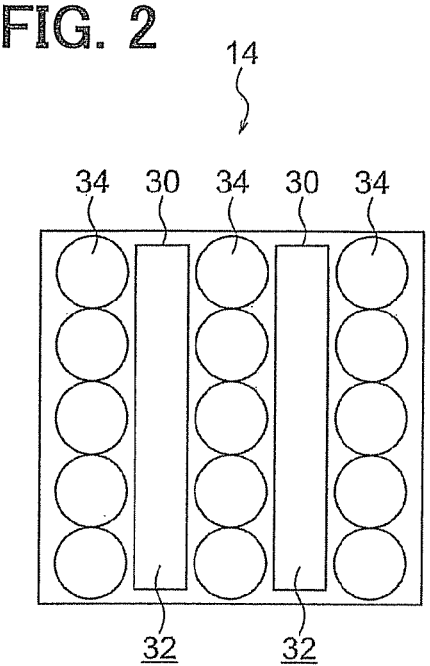
FIG. 2 is a diagram illustrating a cross-sectional view taken along a line II-II in FIG. 1.

As shown in FIG. 2, a heat exchanging part 30 is provided inside of the first reaction vessel 14. The heat exchanging part 30 forms a gas passage 32 therein through which the exhaust gas 27 flows.

As an example of a chemical compound, a chemical heat storage material 34 is disposed around the heat exchanging part 30 inside of the first reaction vessel 14. The chemical heat storage material 34 causes a hydration reaction with the water supplied from the receptacle 12 to generate water vapor by the heat of reaction produced through the hydration reaction. Also, the chemical heat storage material 34 causes a dehydration reaction by receiving heat of the exhaust gas 27.

In the present embodiment, for example, the chemical heat storage material 34 is a calcium oxide (CaO), which is one of alkali earth metal hydroxides. In the first vessel 14, therefore, the following hydration reaction and dehydration reaction are reversibly carried out:

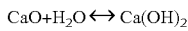

The above chemical formula can be shown with the heat storage quantity and the heat value Q as follows:

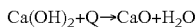

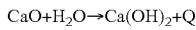

As shown in FIG. 1, the second reaction vessel 16 is connected to the first reaction vessel 14 through a pipe 36 in a hermetically closed state. The second reaction vessel 16 is disposed inside of the exhaust pipe 28, and is located upstream of the first reaction vessel 14 with respect to a flow of the exhaust gas 27.

Figure 3:
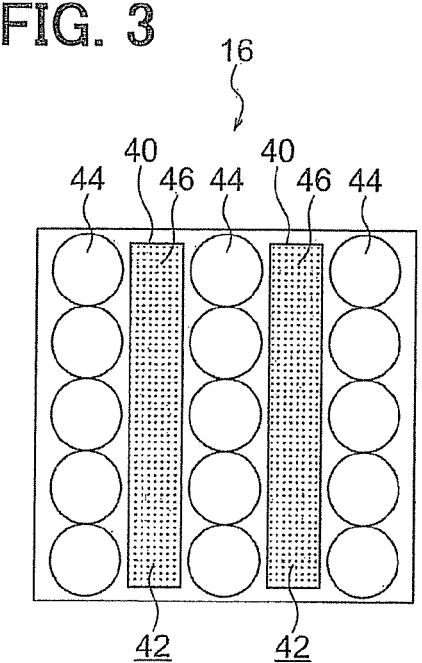
FIG. 3 is a diagram illustrating a cross-sectional view taken along a line in FIG. 1.

As shown in FIG. 3, a heat exchanging part 40 is disposed inside of the second reaction vessel 16. The heat exchanging part 40 forms a gas passage 42 therein through which the exhaust gas 27 flows.

A chemical heat storage material 44 is disposed around the heat exchanging part 40 inside of the second reaction vessel 16. The chemical heat storage material 44 generates heat by carrying out a hydration reaction with the water vapor supplied from the first reaction vessel 14. Also, the chemical heat storage material 44 stores heat by carrying out a dehydration reaction with the heat of the exhaust gas 27. In the present embodiment, for example, the chemical heat storage material 44 is a calcium oxide (CaO).

A catalyst 46, which purifies the exhaust gas 27, is supported inside of the gas passage 42. The catalyst 46 is an object to be heated by the chemical heat storage material 44. The catalyst 46 is thermally in contact with the chemical heat storage material 44 through the heat exchanging part 40.

As shown in FIG. 1, the condenser 18 is connected to the second reaction vessel 16 through a pipe 50 in a hermetically closed state. The pipe 50 is provided with an on-off valve 48. Further, the condenser 18 is connected to the receptacle 12 through a pipe 52 in a hermetically closed state. The condenser 18 is cooled by a fluid 45, and hence the water vapor supplied from the second reaction vessel 16 is condensed.

In the chemical heat accumulator 10, when the water is supplied from the receptacle 12 to the first reaction vessel 14, the hydration reaction as shown by the above chemical formula is carried out between the chemical heat storage material 34 and the water in the first reaction vessel 14. Thus, the water vapor is produced by the heat generated through the hydration reaction. The water vapor is supplied to the second reaction vessel 16. In the second reaction vessel 16, the hydration reaction as shown by the above chemical formula is carried out between the water vapor supplied from the first reaction vessel 14 and the chemical storage material 44. Thus, heat is generated.

Meanwhile, the water vapor generated in the second reaction vessel 16 in accordance with the dehydration reaction is supplied to the condenser 18. In the condenser 18, the water vapor supplied from the second reaction vessel 16 is condensed into the water. The water is supplied to the receptacle 12.

Next, an operation and advantageous effects of the present embodiment will be described.

In the chemical heat accumulator 10 of the present embodiment, heat is generated as the chemical heat storage material 34 contained in the first reaction vessel 14 reacts with the water, and the water vapor is generated as the water is supplied to the chemical heat storage material 34. Further, in the second reaction vessel 16, heat is generated as the water vapor from the first reaction vessel 14 causes the hydration reaction with the chemical heat storage material 44. In this way, the heat is generated in two stages, such as in the first reaction vessel 14 and the second reaction vessel 16. Therefore, the heat having a higher temperature can be generated, as compared with the case where the heat is generated by a hydration reaction in a single reaction vessel.

In the second reaction vessel 16, the catalyst 46 is thermally in contact with the chemical heat storage material 44 through the heat exchanging part 40. Therefore, the temperature of the catalyst 46 can be increased. With this, emission contained in the exhaust gas 27 can be further efficiently purified.

Because the water is directly supplied to the first reaction vessel 14, the heat of the hydration reaction can be immediately conducted to the water. As such, the speed of reaction is improved, and hence the catalyst 46 is promptly heated.

As described above, two separate reaction vessels, such as the first reaction vessel 14 and the second reaction vessel 16, are provided. The water vapor having a high pressure is generated in the first reaction vessel 14, and the water vapor is reacted with the chemical heat storage material 44 in the second reaction vessel 16. Therefore, an internal pressure of a hermetically closed system constructed by the receptacle 12, the first reaction vessel 14, the second reaction vessel 16 and the condenser 18 can be reduced.

Moreover, the chemical heat storage material 44 contained in the second reaction vessel 16 is thermally in contact with the catalyst 46 as the object to be heated. Therefore, the heat exchange capacity can be increased, as compared with a case where heat is conducted from the chemical heat storage material to the catalyst through the exhaust gas. With this, the size of the chemical heat accumulator 10 can be reduced.

In the above described structure, the water of the receptacle 12 is fed to the first reaction vessel 14 by means of the pump 22. Alternatively, the water of the receptacle 12 may be fed to the first reaction vessel 14 by the gravity.

In the first reaction vessel 14, the chemical heat storage material 34 is contained as an example of the chemical compound. Alternative to the chemical heat storage material 34, any other chemical compounds that can cause a hydration reaction with the water supplied from the receptacle 12 to generate the water vapor and can cause a dehydration reaction by being heated are adopted.

The above described heat storage and heat generation mechanism of the chemical heat storage materials 34, 44 will be supplementally described with reference to FIG. 4.

Figure 4:
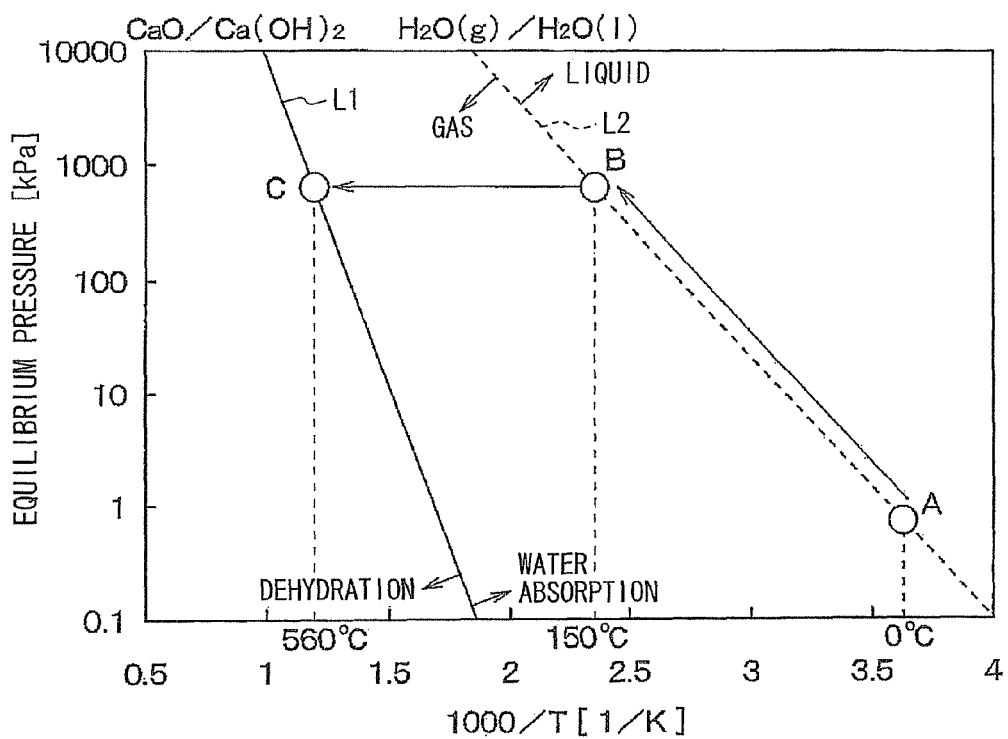
FIG. 4 is a graph illustrating an equilibrium line of a water absorption reaction of calcium oxide and a vapor liquid equilibrium line of water in a heat radiation mode of the chemical heat accumulator according to the first embodiment.

FIG. 4 is graph illustrating an equilibrium line of a water absorption reaction of the calcium oxide and a gas liquid equilibrium line of the water in a heat radiation mode of the chemical heat accumulator of the present embodiment. In FIG. 4, the horizontal axis represents a reciprocal of temperature, and the vertical axis represents gas pressure. A solid line L1 indicates the equilibrium line of the calcium oxide in the water absorption reaction, and a dashed line L2 indicates the gas liquid equilibrium line of the water.

As shown in FIG. 4, in the heat radiation mode, when an initial temperature is zero degree Celsius, the temperature and the pressure of the first reaction vessel 14 and the second reaction vessel 16 are indicated at a point A. In this state, when the water is supplied to the first reaction vessel 14, the temperature and the pressure of the first reaction vessel 14 increase from the point A to a point B due to the reaction (water absorption reaction) between the calcium oxide and the water as shown by the following chemical formula:

$$CaO + H_2O \leftrightarrow Ca(OH)_2$$

At this time, the water vapor having a high temperature (e.g., approximately 150 degrees Celsius) and a high pressure is introduced into the second reaction vessel 16 through the pipe 36.

In the second reaction vessel 16, the calcium oxide is reacted with the high temperature and high pressure water vapor (e.g., see the point B in FIG. 4) generated in the first reaction vessel 14 as shown by the above chemical formula (water absorption reaction), and thus the temperature rises to approximately 560 degrees Celsius (e.g., see a point C in FIG. 4). The heat generated by the above reaction is used to heat the catalyst 46. In this way, in the chemical heat accumulator 10 of the present embodiment, the heat having a high temperature of approximately 560 degrees Celsius can be generated.

Second Embodiment

A second embodiment will be described with reference to FIGS. 5 and 6.

In a chemical heat accumulator 60 of the present embodiment, a structure is modified from the chemical heat accumulator 10 of the first embodiment as follows.

The chemical heat accumulator 60 has a pair of second reaction vessels 16A, 16B, in place of the single second reaction vessel 16. The second reaction vessel 16B is disposed downstream of the second reaction vessel 16A in the exhaust pipe 28 with respect to the flow of the exhaust gas 27. The first reaction vessel 14 is disposed downstream of the second reaction vessel 16B in the exhaust pipe 28 with respect to the flow of the exhaust gas 27. Hereinafter, the second reaction vessel 16A is also referred to as the upstream second reaction vessel 16A, and the second reaction vessel 16B is also referred to as the downstream second reaction vessel 16B.

Each of the second reaction vessels 16A, 16B has a structure similar to that of the second reaction vessel 16 of the first embodiment. Each of the second reaction vessels 16A, 16B contains the chemical heat storage material 44 therein, and has the gas passage 42 supporting the catalyst 46 therein (e.g., see FIG. 3).

Each of the second reaction vessels 16A, 16B is connected to the first reaction vessel 14 through a pipe 62 in a hermetically closed state. The pipe 62 includes a main portion 62A extending from the first reaction vessel 14 and a pair of branch portions 62B each connecting between the main portion 62A and the corresponding second reaction vessel 16A, 16B. The branch portion 62B connecting between the main portion 62A and the upstream second reaction vessel 16A is provided with an on-off valve 64. The branch portion 62B connecting between the main portion 62A and the downstream second reaction vessel 16B is provided with an on-off valve 65.

Each of the second reaction vessels 16A, 16B is connected to the condenser 18 through the pipe 50 in a hermetically closed state. The pipe 50 includes a pair of branch portions 50A, 50B extending from the respective second reaction vessels 16A, 16B and a main portion 50C connecting between the pair of branch portions 50A, 50B and the condenser 18.

The chemical heat accumulator 60 has a control unit 66 that controls operations of the on-off valves 64, 65. The control unit 66 controls the on-off valves 64, 65 so as to control the amount of the water vapor supplied to each of the second reaction vessels 16A, 16B and the timing to supply the water vapor to each of the second reaction vessels 16A, 16B.

For example, the control unit 66 controls the on-off valves 64, 65 so that the water vapor is supplied from the first reaction vessel 14 to the upstream second reaction vessel 16A in an initial stage when the engine is started. Also, the control unit 66 controls the on-off valves 64, 65 so that the water vapor is supplied from the first reaction vessel 14 to each of the second reaction vessels 16A, 16B, when the temperature of the chemical heat storage material 44 of each of the second reaction vessels 16A, 16B is lower than an equilibrium temperature of the chemical heat storage material 44 in a stage after the initial stage. For example, the control unit 66 controls each of the on-off valves 64, 65 so that the temperature of the chemical heat storage material 44 of the respective second reaction vessel 16A, 16B reaches the equilibrium temperature in the state after the initial stage.

Figure 6:
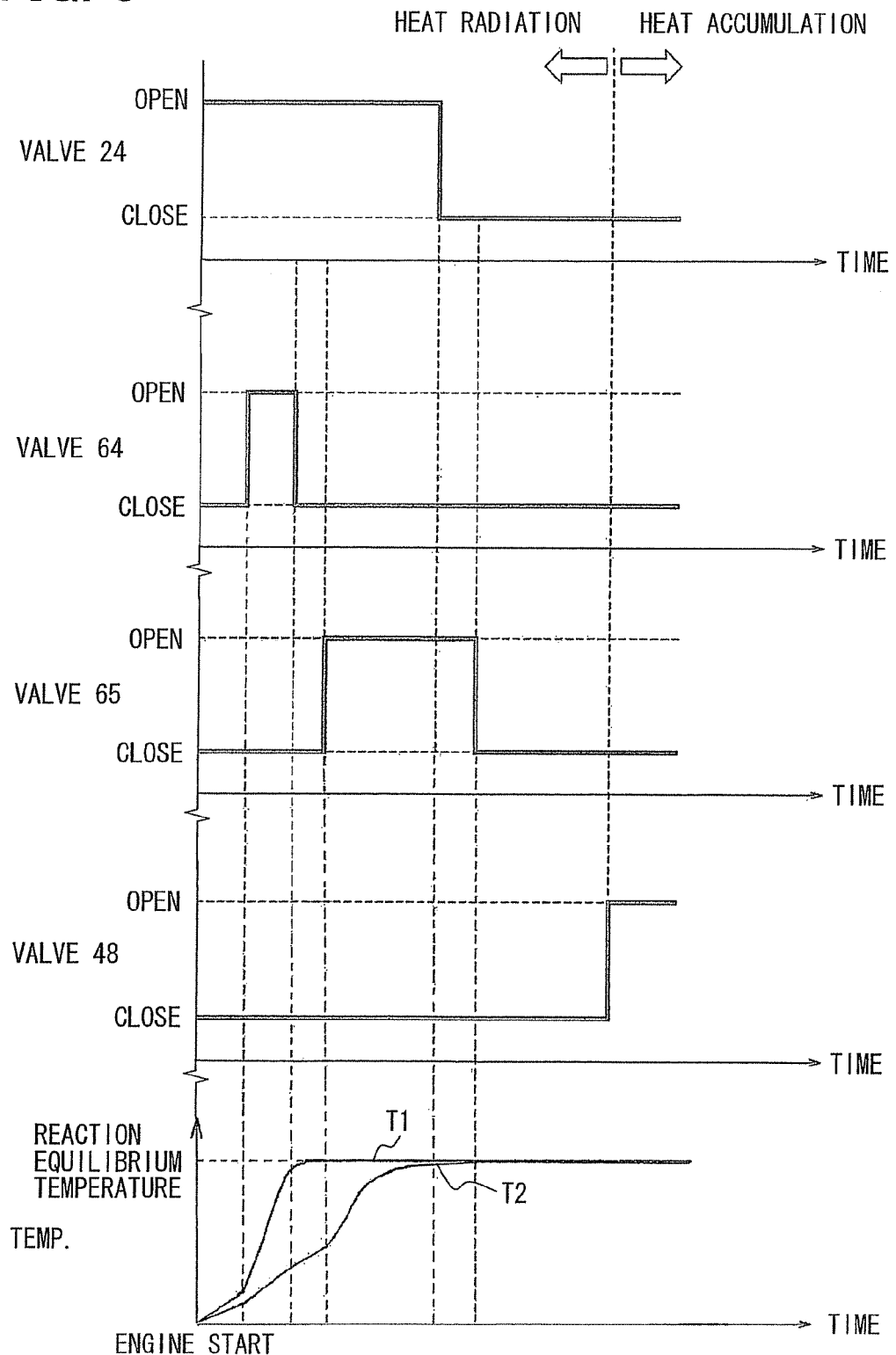
FIG. 6 is a diagram illustrating a time chart of operations of on-off valves and the change in temperature of a first reaction vessel and a second vessel of the chemical heat accumulator according to the second embodiment.

FIG. 6 is a time chart illustrating an example of switching operations of the on-off valves 24, 65, 64 and 48 after the engine is started. In FIG. 6, a line T1 indicates the temperature of the upstream second reaction vessel 16A, and a line T2 indicates the temperature of the downstream second reaction vessel 16B.

Next, an operation and advantageous effects of the present embodiment will be described.

In the chemical heat accumulator 60 of the present embodiment, in the initial stage of the engine start-up, the water is supplied from the first reaction vessel 14 to the upstream second reaction vessel 16A. Therefore, the chemical heat storage material 44 of the upstream second reaction vessel 16A can promptly generate heat. With this, the heat of reaction can be generated from the catalyst 46 by the heat of the chemical heat storage material 44. Further, the temperature of the downstream second reaction vessel 16B and the temperature of the first reaction vessel 14 can be increased by the heat generated in the upstream second reaction vessel 16A.

After the initial stage, the heat capacity of the first reaction vessel 14, which is required to generate the water vapor by supplying the water to the first reaction vessel 14, or the heat capacity of the downstream second reaction vessel 16B, which is required when the water vapor generated in the first reaction vessel 14 is supplied to the downstream second reaction vessel 16B, can be cancelled by the heat generated in the upstream second reaction vessel 16A in the initial stage. As such, the reactivity in heating the catalyst 46 can be improved. Further, the water vapor having a higher temperature can be generated in the first reaction vessel 14, and the increase in temperature, can be expected in the downstream second reaction vessel 16B.

As described above, in the chemical heat accumulator 60 of the present embodiment, the amount of the water vapor and the timing to supply the water vapor from the first reaction vessel 14 to each of the second reaction vessels 16A, 16B can be controlled. Therefore, the catalyst 46 can be suitably heated.

Figure 5:
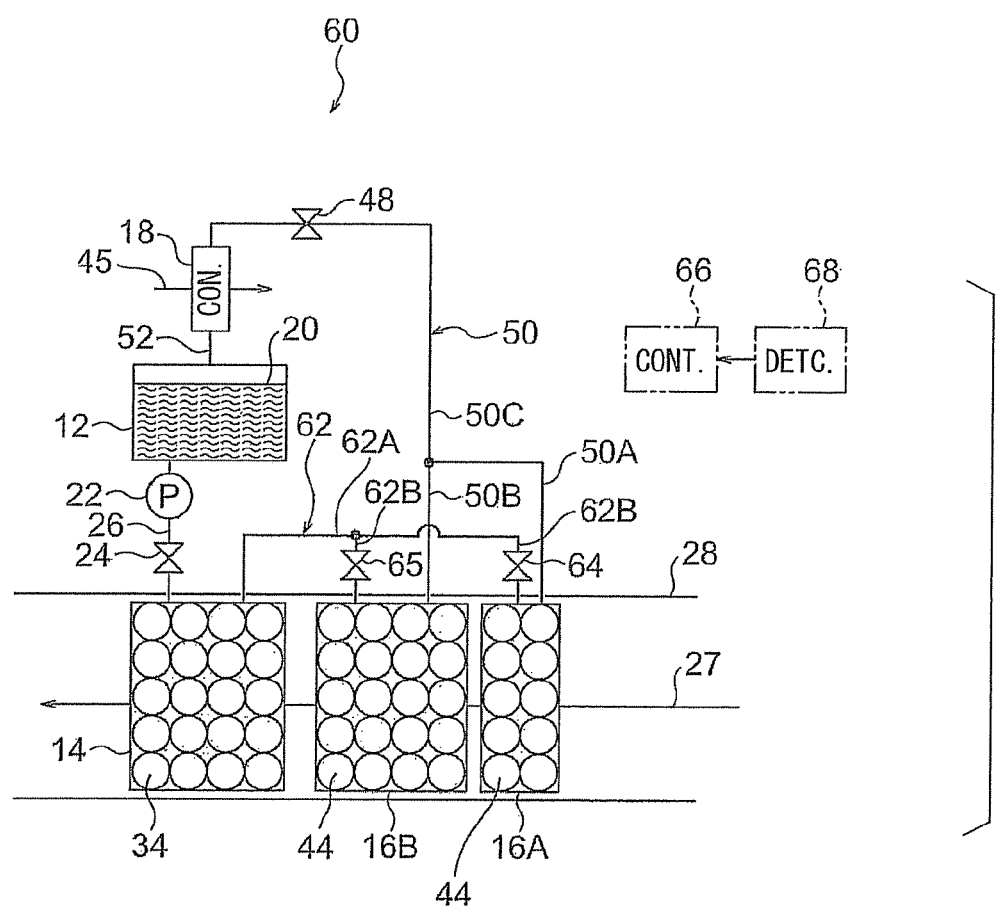
FIG. 5 is a diagram illustrating a schematic structure of a chemical heat accumulator according to a second embodiment.

As shown in FIG. 5, the chemical heat accumulator 60 of the present embodiment may further have an operation state detector 68 that detects a discharge pressure and a rotational speed of the engine. In such a case, the control unit 66 is configured to provide the following control operation based on a detection result of the operation state detector 68.

For example, the control unit 66 controls the on-off valves 64, 65 so that the water vapor is supplied from the first reaction vessel 14 to the upstream second reaction vessel 16A when it is determined that the engine is in a partial load operation based on the detection result of the operation state detector 68. Also, the control unit 66 controls the on-off valves 64, 65 so that the water vapor is supplied from the first reaction vessel 14 to each of the second reaction vessels 16A, 16B until the temperature of each of the second reaction vessels 16A, 16B reaches the equilibrium temperature of the chemical heat storage material 44, when it is determined that the engine is in a full load operation based on the detection result of the operation state detector 68.

In such a configuration, when the engine is in the partial load operation in the initial stage of the engine start-up, the exhaust gas emission can be reduced by increasing the temperature of only the upstream second reaction vessel 16A. When the engine is in the full load condition, the exhaust gas emission can be reduced by increasing the temperature of only the downstream second reaction vessel 16B.

In the present embodiment, the chemical heat accumulator 60 may have two or more second reaction vessels.

Third Embodiment

A third embodiment will be described with reference to FIGS. 7 and 8.

In a chemical heat accumulator 70 of the present embodiment, a structure is modified from the chemical heat accumulator 10 of the first embodiment as follows.

Figure 7:
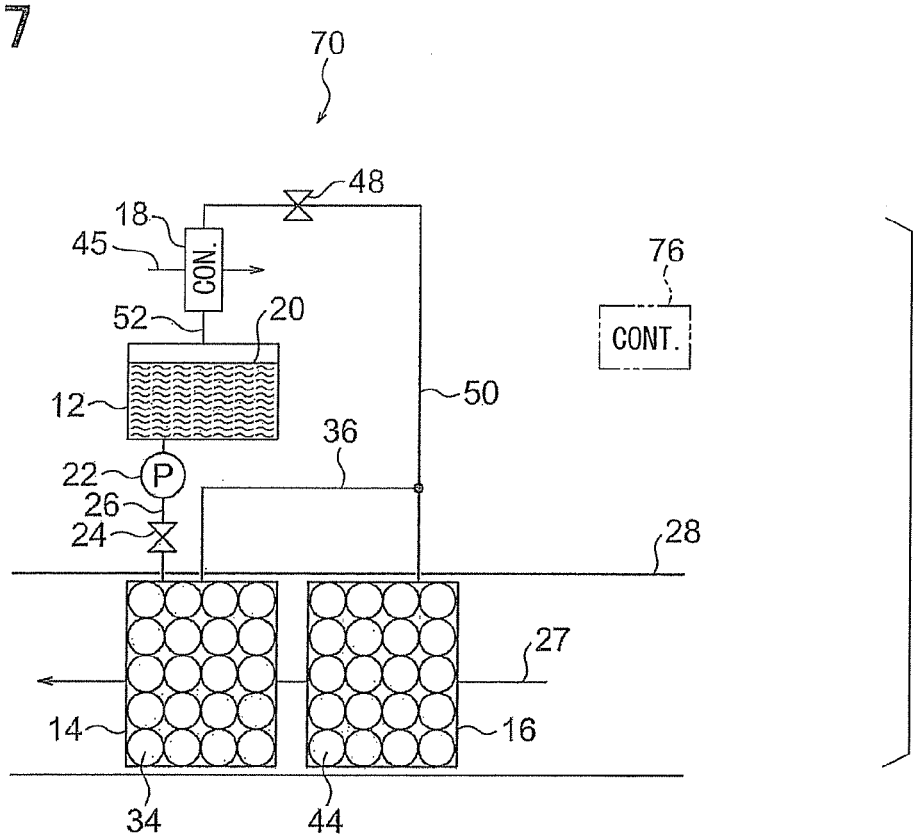
FIG. 7 is a diagram illustrating a schematic structure of a chemical heat accumulator according to a third embodiment.

As shown in FIG. 7, the pipe 36 that connects between the first reaction vessel 14 and the second reaction vessel 16 is connected to a part of the pipe 50 that connects between the second reaction vessel 16 and the condenser 18. For example, the pipe 36 is connected to a substantially middle location of the pipe 50 with respect to a longitudinal direction of the pipe 50. The on-off valve 48 is disposed on the pipe 50, at a location between a connecting point with the pipe 36 and the condenser 18.

In the chemical heat accumulator 70, when the on-off valve 48 is in a closed state (e.g., a first state), the first reaction vessel 14 is communicated with the second reaction vessel 16. On the other hand, when the on-off valve 48 is in an open state (e.g., a second state), the first reaction vessel 14 is communicated with the condenser 18, and the second reaction vessel 18 is communicated with the condenser 18.

The chemical heat accumulator 70 has a control unit 76 that controls the on-off valve 48. The control unit 76 switches the on-off valve 48 to the closed state to allow the communication between the first reaction vessel 14 and the second reaction vessel 16, when the hydration reaction is carried out in the first reaction vessel 14 and the second reaction vessel 16. The control unit 76 switches the on-off valve 48 to the open state to allow communication between the first reaction vessel 14 and the condenser 18 and between the second reaction vessel 16 and the condenser 18, when the dehydration reaction is carried out in the first reaction vessel 14 and the second reaction vessel 16.

Figure 8:
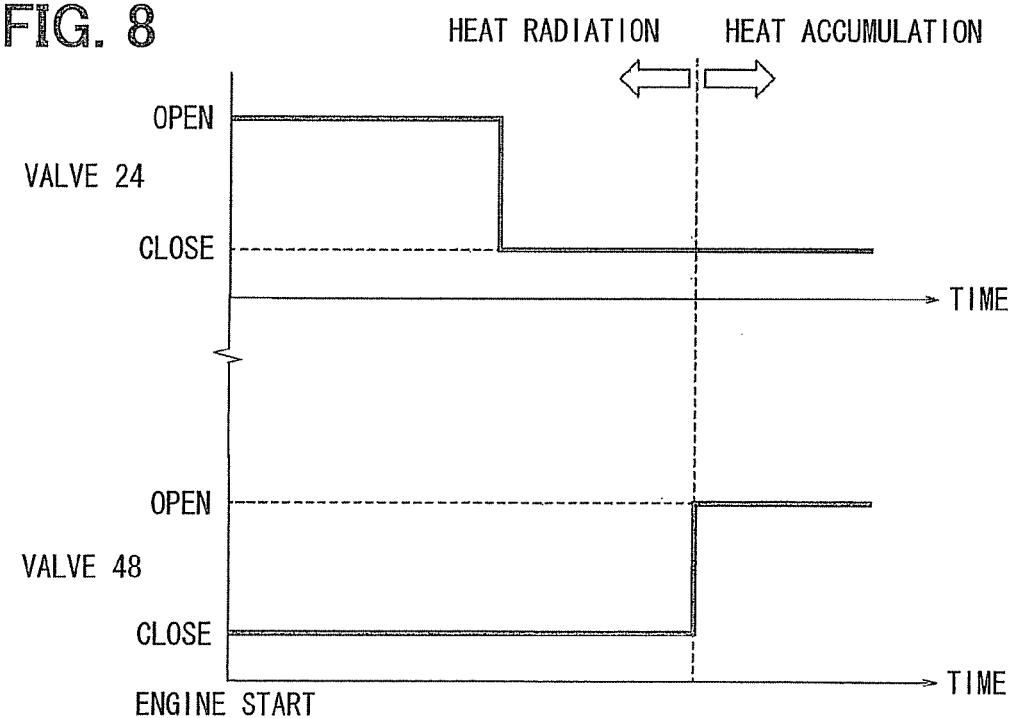
FIG. 8 is a diagram illustrating a time chart of operations of on-off valves of the chemical heat accumulator according to the third embodiment.

FIG. 8 is a time chart illustrating an example of switching operations of the on-off valve 24, 48 after the engine is started.

Next, an operation and advantageous effects of the present embodiment will be described.

For example, in a structure where the water vapor generated in the first reaction vessel 14 reaches the condenser 18 through the second reaction vessel 16 at the time of dehydration reaction of the chemical heat storage material 34 of the first reaction vessel 14, pressure loss of the water vapor from the first reaction vessel 14 to the condenser 18 through the second reaction vessel 16 is greater than pressure loss of the water vapor from the second reaction vessel 16 to the condenser 18. In such a case, therefore, it is necessary to increase a dehydration temperature of the first reaction vessel 14 so as to promote the dehydration reaction of the chemical heat storage material 34 of the first reaction vessel 14.

In the chemical heat accumulator 70 of the present embodiment, on the other hand, the first reaction vessel 14 is communicated with the condenser 18 and the second reaction vessel 16 is communicated with the condenser 18 as the on-off valve 48 is switched to the open state when the dehydration reaction is carried out in the first reaction vessel 14 and the second reaction vessel 16. That is, the first reaction vessel 14 is communicated with the condenser 18 so that water vapor generated from the chemical heat storage material 34 of the first reaction vessel 14 can reach the condenser 18 without passing through the second reaction vessel 16. As such, the pressure loss from the first reaction vessel 14 to the condenser 18 can be reduced, and the dehydration reaction in the first reaction vessel 14 can be accelerated.

Fourth Embodiment

A fourth embodiment will be described with reference to FIGS. 9 and 10.

In a chemical heat accumulator 80 of the present embodiment, a structure is modified from the chemical heat accumulator 10 of the first embodiment as follows.

Figure 9:
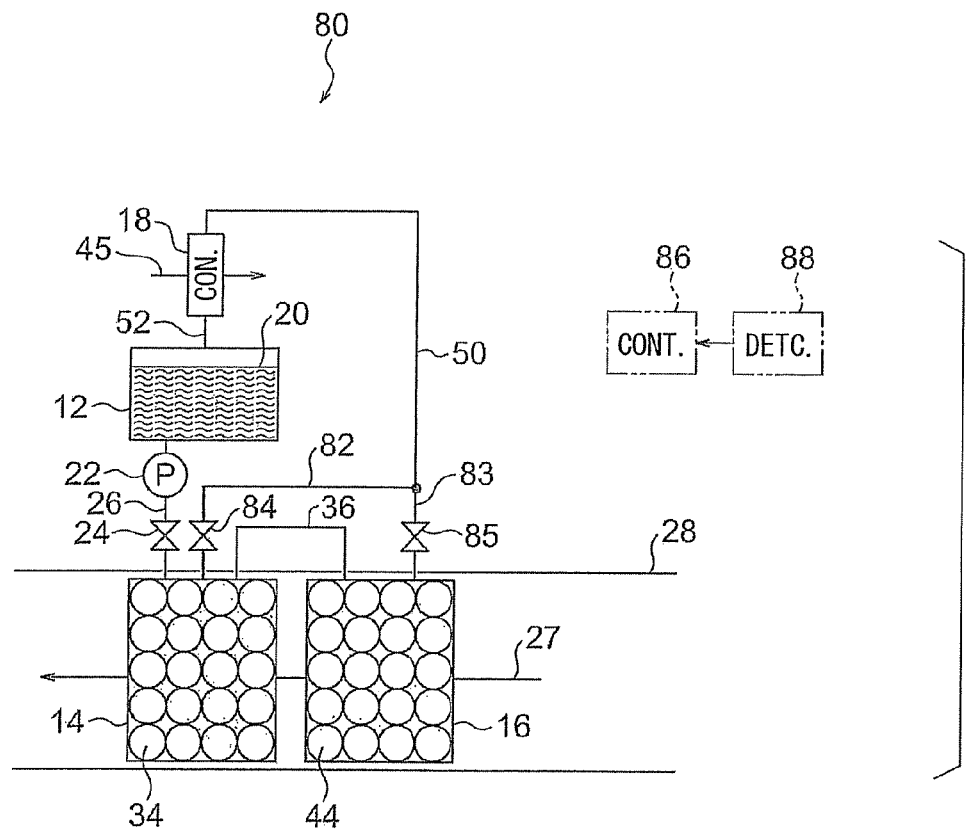
FIG. 9 is a diagram illustrating a schematic structure of a chemical heat accumulator according to a fourth embodiment.

As shown in FIG. 9, a first pipe 82 extends from the first reaction vessel 14, in addition to the pipe 36. The first pipe 82 connects to a part of the pipe 50 that connects between the second reaction vessel 16 and the condenser 18. For example, the first pipe 82 connects to a substantially middle location of the pipe 50 with respect to a longitudinal direction of the pipe 50. Further, a portion of the pipe 50 between a connecting portion with the first pipe 82 and the second reaction vessel 16 is provided as a second pipe 83.

The first pipe 82 is provided with a first on-off valve 84 as a first flow rate control valve. The second pipe 83 is provided with a second on-off valve 85 as a second flow rate control valve.

The chemical heat accumulator 80 has a control unit 86 that controls the first on-off valve 84 and the second on-off valve 85. The control unit 86 switches the first on-off valve 84 to an open state and the second on-off valve 85 to a closed state when the dehydration reaction is carried out in the first reaction vessel 14 and the second reaction vessel 16.

The chemical heat accumulator 80 further has a reaction state detector 88 that detects the temperature or the internal pressure of the first reaction vessel 14 and the second reaction vessel 16. The control unit 86 controls the first on-off valve 84 and the second on-off valve 85 based on a detection result of the reaction state detector 88 so that the temperature or the internal pressure is equal between the first reaction vessel 14 and the second reaction vessel 16.

Figure 10:
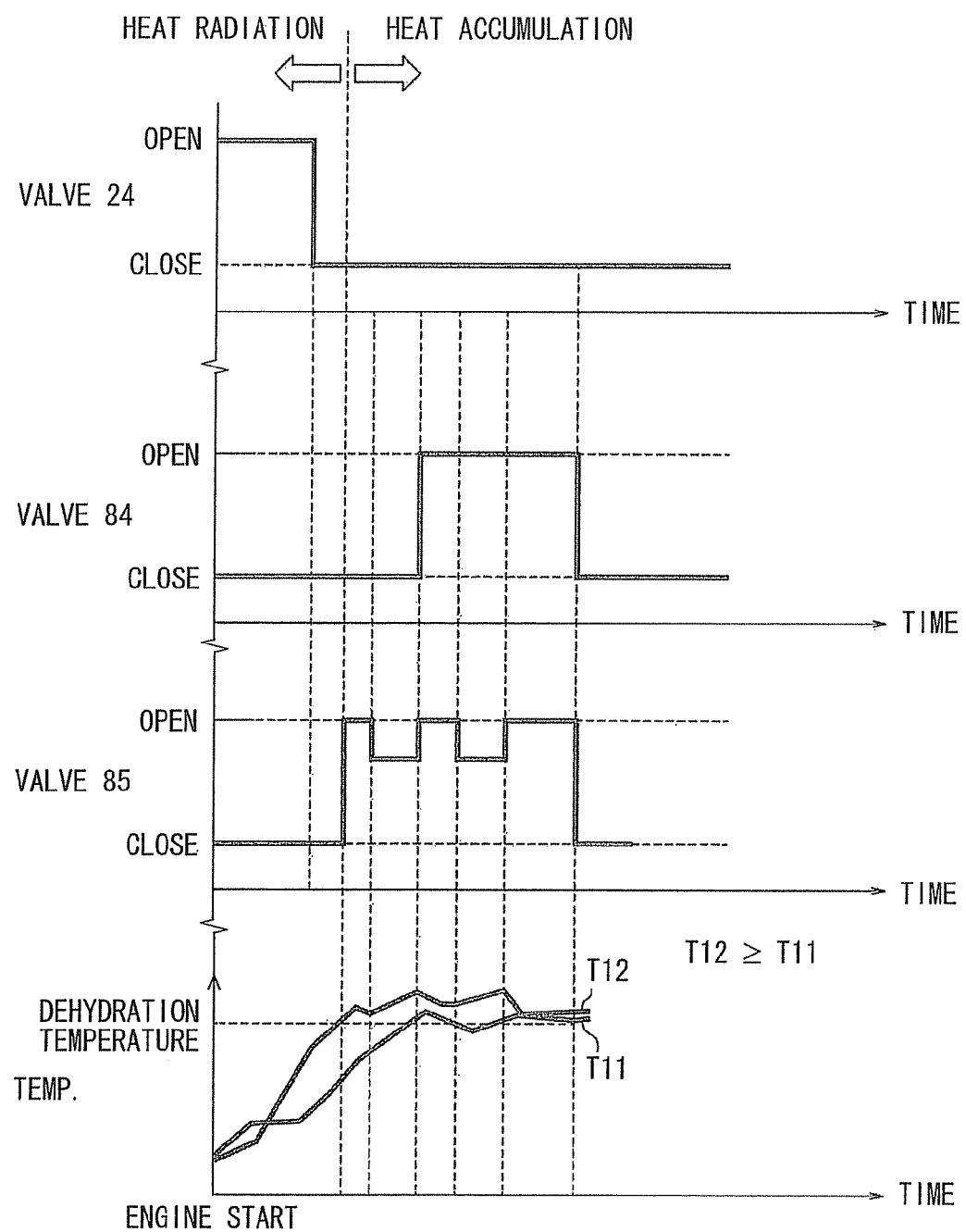
FIG. 10 is a diagram illustrating a time chart of operations of on-off valves and the change in temperature of a first reaction vessel and a second reaction vessel of the chemical heat accumulator according to the fourth embodiment.

FIG. 10 is a time chart illustrating an example of switching operations of the on-off valve 24 and the first and second on-off valves 84, 85 by the control unit 86 after the engine is started, and an example of change in temperature of the first reaction vessel 14 and the second reaction vessel 16. In FIG. 10, a line T11 indicates the temperature of the first reaction vessel 14, and a line T12 indicates the temperature of the second reaction vessel 16.

Next, an operation and advantageous effects of the present embodiment will be described.

In the chemical heat accumulator 80 of the present embodiment, the flow rate of the first pipe 82, which connects between the first reaction vessel 14 and the condenser 18, is controlled by the first on-off valve 84, and the flow rate of the second pipe 83, which connects between the condenser 18 and the second reaction vessel 16, is controlled by the second on-off valve 85. As such, the dehydration reaction of the first reaction vessel 14 and the dehydration reaction of the second reaction vessel 16 can be respectively controlled. Since the dehydration reaction of the first reaction vessel 14 and the dehydration reaction of the second reaction vessel 16 are separately controlled, degradation of a heating capacity of the second reaction vessel 16 for heating the catalyst 46 can be restricted.

For example, in a case where the dehydration reaction of the first reaction vessel 14 is not sufficiently carried out, even if the water is supplied to the first reaction vessel 14 when the system is started next time, it is difficult to supply the water vapor to heat the second reaction vessel 16. For example, in a case where the dehydration reaction of the second reaction vessel 16 is not sufficiently carried out, the amount of the chemical heat storage material 44 that can react with the water vapor from the first reaction vessel 14 is insufficient. Therefore, it is difficult to heat the second reaction vessel 16. The chemical heat accumulator 80 of the present embodiment can solve the these matters.

Further, the second reaction vessel 16 is located upstream of the first reaction vessel 14 with respect to the flow of the exhaust gas 27 in the exhaust pipe 28. Therefore, the temperature of the dehydration reaction of the second reaction vessel 16 is higher than that of the first reaction vessel 14. As such, the dehydration reaction of the second reaction vessel 16 can be accelerated.

The chemical heat storage material 44 absorbs heat in the dehydration reaction. Therefore, the temperature of the exhaust gas 27 reduces while passing through the second reaction vessel 16 to the first reaction vessel 14. As such, the dehydration temperature of the first reaction vessel 14 reduces, resulting in the degradation of the dehydration reaction in the first reaction vessel 14.

In the chemical heat accumulator 80 of the present embodiment, when the dehydration reaction is carried out in the first reaction vessel 14 and the second reaction vessel 16, the second on-off valve 85 is switched to the closed state so as to temporarily stop the dehydration reaction in the second reaction vessel 16. Therefore, the decrease in temperature of the exhaust gas 27 passing through the second reaction vessel 16 is restricted, and the temperature of the first reaction vessel 14 can be increased. As such, the dehydration reaction of the first reaction vessel 14 can be accelerated.

Further, the first on-off valve 84 and the second on-off valve 85 are controlled so that the temperature or the internal pressure is equal between the first reaction vessel 14 and the second reaction vessel 16. Therefore, the dehydration reaction of the first reaction vessel 14 and the dehydration reaction of the second reaction vessel 16 can be accelerated while keeping balance therebetween.

Fifth Embodiment

A fifth embodiment will be described with reference to FIG. 11.

In a chemical heat accumulator of the present embodiment, a structure is modified from the chemical heat accumulator 10 of the first embodiment as follows.

Figure 11:
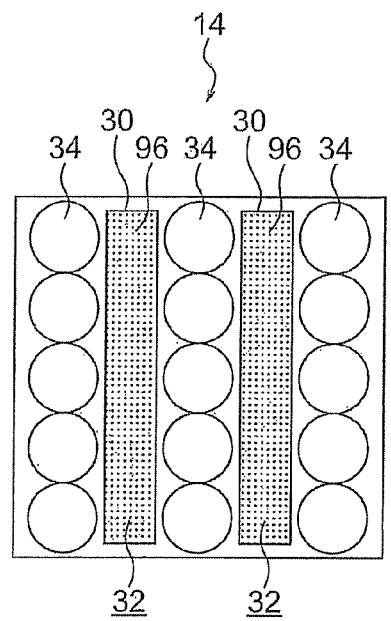
FIG. 11 is a diagram illustrating a cross-sectional view of a first reaction vessel of a chemical heat accumulator according to a fifth embodiment.

As shown in FIG. 11, the first reaction vessel 14 supports a catalyst 96 in the gas passage 32 for purifying the exhaust gas 27. The catalyst 96 is thermally in contact with the chemical heat storage material 34 through the heat exchanging part 30.

Next, an operation and advantageous effects of the present embodiment will be described.

In the chemical heat accumulator of the present embodiment, since the catalyst 96 is supported in the gas passage 32 of the first reaction vessel 14, the heat of reaction of the catalyst 96 can be collected in the dehydration reaction. With this, the heat can be applied to the first reaction vessel 14 and the second reaction vessel 16. Therefore, the dehydration temperature can be increased, accelerating the dehydration reaction. The catalyst 96 is, for example, an under-floor catalyst. In such a case, the size of the chemical heat accumulator can be reduced.

Sixth Embodiment

A sixth embodiment will be described with reference to FIGS. 12 through 14.

In a chemical heat accumulator 100 of the present embodiment, a structure is modified from the chemical heat accumulator 10 of the first embodiment as follows.

Figure 12:
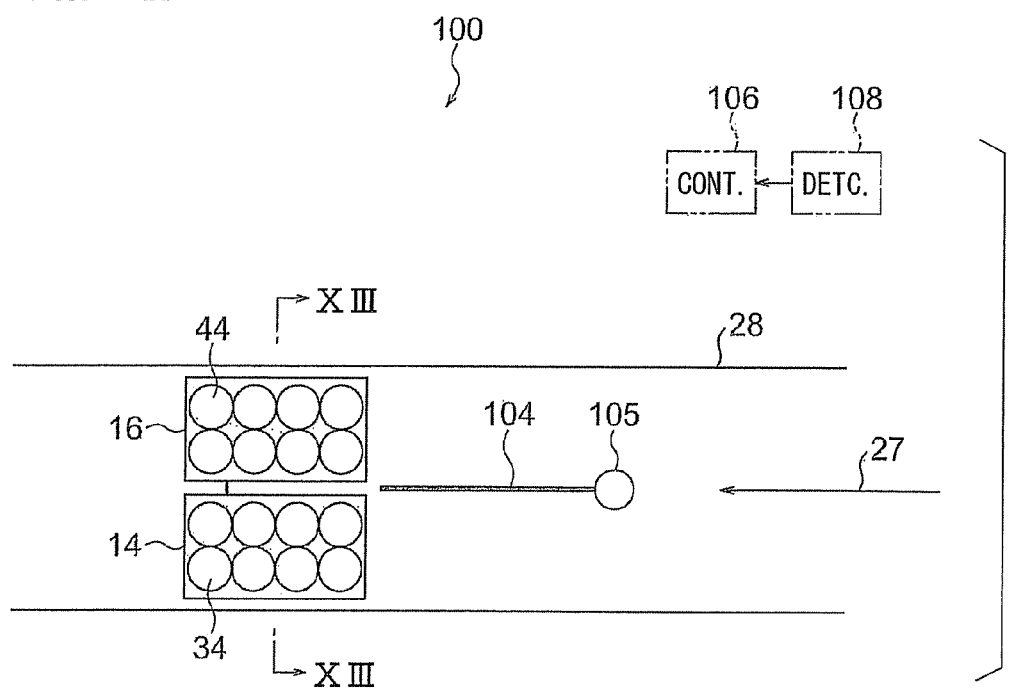
FIG. 12 is a diagram illustrating a schematic structure of a main part of a chemical heat accumulator according to a sixth embodiment.

As shown in FIG. 12, the first reaction vessel 14 and the second reaction vessel 16 are disposed in the exhaust pipe 28 and arranged on the same plane defined perpendicular to a longitudinal axis of the exhaust pipe 28.

Figure 13:
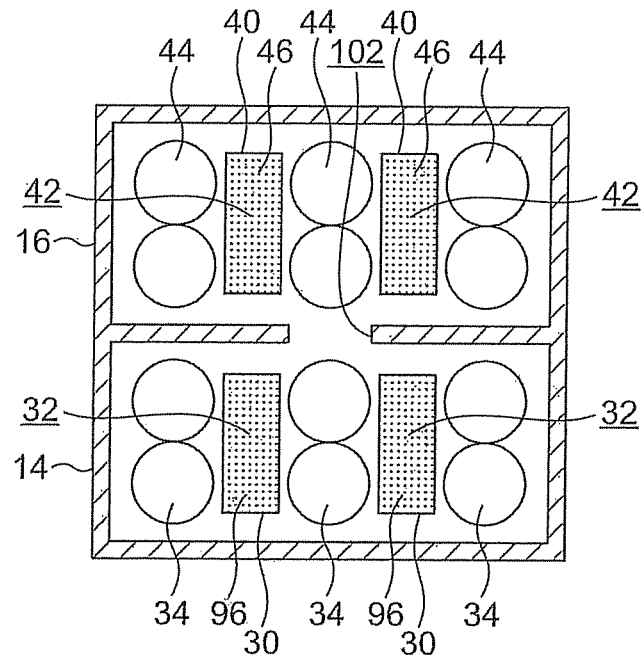
FIG. 13 is a diagram illustrating a cross-sectional view taken along a line XIII-XIII in FIG. 12.

As shown in FIG. 13, the first reaction vessel 14 is disposed under the second reaction vessel 16 with respect to a direction of gravity. A communication channel 102 is formed between the first reaction vessel 14 and the second reaction vessel 16. The communication channel 12 extends in the direction of gravity. The first reaction vessel 14 and the second reaction vessel 16 are communicated with each other through the communication channel 102.

The first reaction vessel 14 supports the catalyst 96 in the gas passage 32 for purifying the exhaust gas 27. The catalyst 96 is thermally in contact with the chemical heat storage material 34 through the heat exchanging part 30.

The exhaust pipe 28 is provided with a movable fin 104. The movable fin 104 is disposed upstream of the first reaction vessel 14 and the second reaction vessel 16 with respect to the flow of the exhaust gas 27. The movable fin 104 is rotatably fixed to the exhaust pipe 28, and is rotated by a driving motor 105.

In the chemical heat accumulator 100, the angle of the movable fin 104 is changed by the driving motor 105 to control the flow rate of the exhaust gas 27 flowing toward the first reaction vessel 14 and the flow rate of the exhaust gas 27 flowing toward the second reaction vessel 16. The movable fin 104 and the driving motor 105 constitute an example of a distribution ratio control unit.

The chemical heat accumulator 100 has a control unit 106 that controls the driving motor 105 and a gas temperature detector 108 that detects the temperature of the exhaust gas 27.

The control unit 106 controls the driving motor 105 so that the flow rate of the exhaust gas 27 introduced toward the second reaction vessel 16 is greater than the flow rate of the exhaust gas 27 introduced toward the first reaction vessel 14 when a detection value based on the gas temperature detector 108 is lower than a predetermined value.

Next, an operation and advantageous effects of the present embodiment will be described.

In the chemical heat accumulator 100 of the present embodiment, the first reaction vessel 14 and the second reaction vessel 16 are disposed in the exhaust pipe 28 and arranged on the same plane defined perpendicular to the longitudinal axis of the exhaust pipe 28. Therefore, when the dehydration reaction is carried out, the temperature of the exhaust gas 27 introduced into the first reaction vessel 14 and the temperature of the exhaust gas 27 introduced into the second reaction vessel 16 are equal. Because the dehydration temperature is equal between the first reaction vessel 14 and the second reaction vessel 16, the dehydration reaction can be evenly accelerated between the first reaction vessel 14 and the second reaction vessel 16.

It is considered to arrange the first reaction vessel 14 and the second reaction vessel 16 in a vertical direction or in a horizontal direction. In the case where the first reaction vessel 14 and the second reaction vessel 16 are arranged in the vertical direction, it is preferable to arrange the first reaction vessel 14 under the second reaction vessel 16 with respect to the direction of gravity.

In a structure where the first reaction vessel 14 is arranged above the second reaction vessel 16, if the water is excessively supplied from the receptacle 12 into the first reaction vessel 14, the heat generated by the hydration reaction in the first reaction vessel 14 is spent by the specific heat of the water, resulting in degradation of generation of the water vapor. In addition, because the water in the liquid state directly flows into the second reaction vessel 16, it is difficult to increase the temperature of the second reaction vessel 16 to a sufficient temperature.

In the chemical heat accumulator 100 of the present embodiment, since the first reaction vessel 14 is arranged under the second reaction vessel 16, the temperature of the second reaction vessel 16 can be sufficiently increased.

Figure 14:
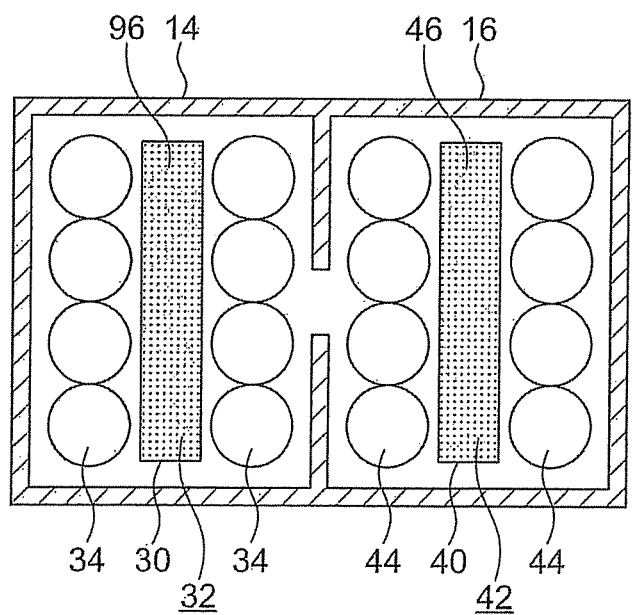
FIG. 14 is a diagram illustrating a cross-sectional view of a first reaction vessel and a second reaction vessel of the chemical heat accumulator according to the sixth embodiment.

In a case that the above described drawbacks can be solved, the first reaction vessel 14 and the second reaction vessel 16 may be arranged in the horizontal direction, as shown in FIG. 14.

In the chemical heat accumulator 100, when the temperature of the exhaust gas 27 is low, such as when the engine is started, the movable fin 104 can be moved to a position to restrict the exhaust gas 27 from flowing into the gas passage 32 of the first reaction vessel 14. In this way, the flow rate of the exhaust gas 27 flowing into the first reaction vessel 14 and the flow rate of the exhaust gas 27 flowing into the second reaction vessel 16 can be suitably controlled depending on the operation state of the engine.

Seventh Embodiment

A seventh embodiment will be described with reference to FIG. 15.

In a chemical heat accumulator 110 of the present embodiment, a structure is modified from the chemical heat accumulator 100 of the sixth embodiment as follows.

Figure 15:
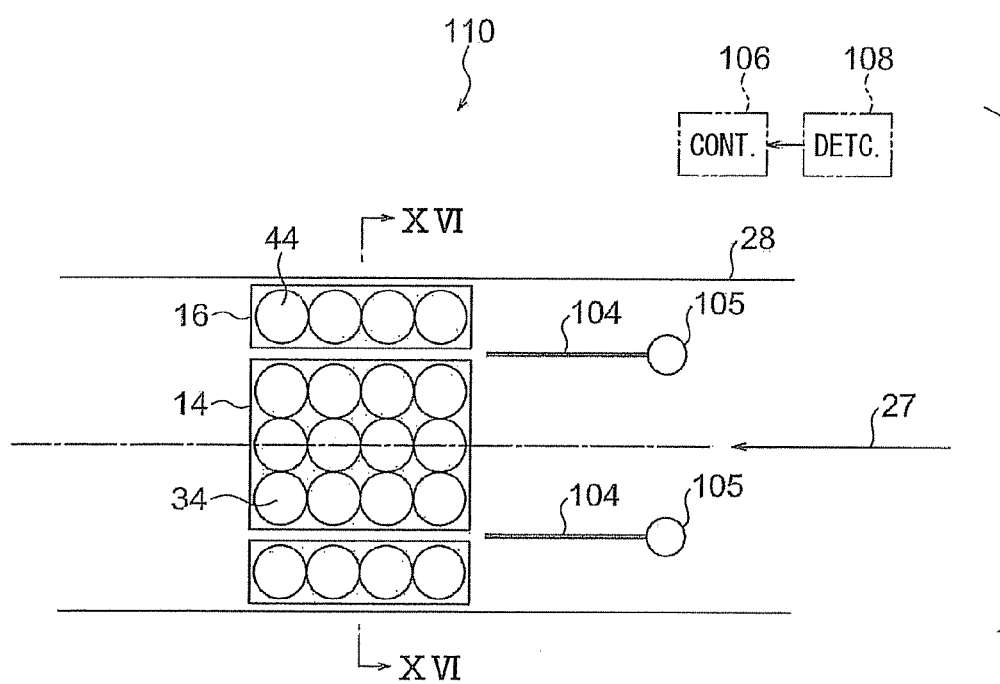
FIG. 15 is a diagram illustrating a schematic structure of a main part of a chemical heat accumulator according to a seventh embodiment.
Figure 16:
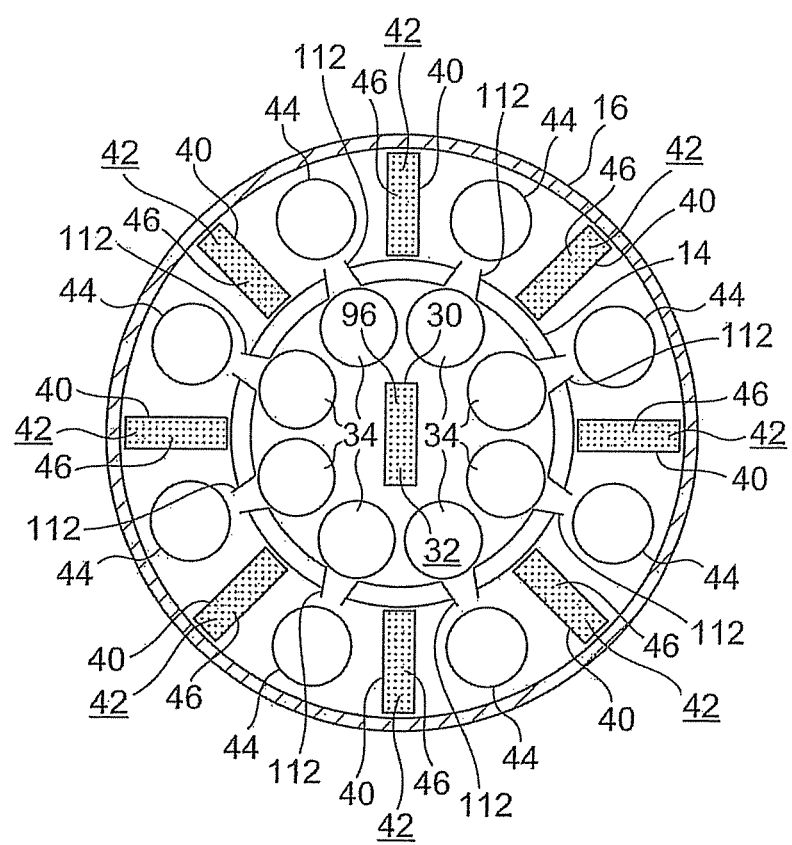
FIG. 16 is a diagram illustrating a cross-sectional view taken along a line XIV-XIV in FIG. 15.

As shown in FIGS. 15 and 16, the first reaction vessel 14 and the second reaction vessel 16 are coaxially arranged in the exhaust pipe 28.

For example, the first reaction vessel 14 has a cylindrical shape, and the second reaction vessel 16 has an annular shape. The second reaction vessel 16 is disposed on a radial outside of the first reaction vessel 14. Communication channels 112 extending in a radial direction are formed between the first reaction vessel 16 and the second reaction vessel 14. The first reaction vessel 14 and the second reaction vessel 16 are in communication with each other through the communication channels 112.

As another example, the second reaction vessel 16 has a cylindrical shape, and the first reaction vessel 14 has an annular shape. The first reaction vessel 14 is disposed on a radial outside of the second reaction vessel 14.

Further, as shown in FIG. 15, a pair of movable fins 104 is disposed at positions corresponding to the boundary between the first reaction vessel 14 and the second reaction vessel 16. Each of the movable fins 104 is moved by the driving motor 105. The driving motor 105 is controlled by the control unit 106 in a manner similar to that of the fifth embodiment.

Next, an operation and advantageous effects of the seventh embodiment will be described.

In the chemical heat accumulator 110 of the present embodiment, the first reaction vessel 14 and the second reaction vessel 16 are coaxially arranged in the exhaust pipe 28. Therefore, the path of the water vapor from the first reaction vessel 14 to the second reaction vessel 16 can be shortened, and hence the pressure loss can be reduced. With this, the temperature of the second reaction vessel 16 can be sufficiently increased. Further, the number of the path of the water vapor can be easily increased. That is, a large number of the water vapor paths can be formed. Therefore, the temperature of the second reaction vessel 16 can be further sufficiently increased.

Also in the chemical heat accumulator 110 of the present embodiment, when the temperature of the exhaust gas 27 is low, such as when the engine is started, the movable fins 104 are moved to the position to restrict the exhaust gas 27 from flowing into the gas passage 32 of the first reaction vessel 14. In this way, the flow rate of the exhaust gas 27 flowing into the first reaction vessel 14 and the flow rate of the exhaust gas 27 flowing into the second reaction vessel 16 can be suitably controlled depending on the operation state of the engine.

Eighth Embodiment

An eighth embodiment will be described with reference to FIG. 17.

In a chemical heat accumulator 120 of the present embodiment, a structure is modified from the chemical heat accumulator 10 of the first embodiment as follows.

Figure 17:
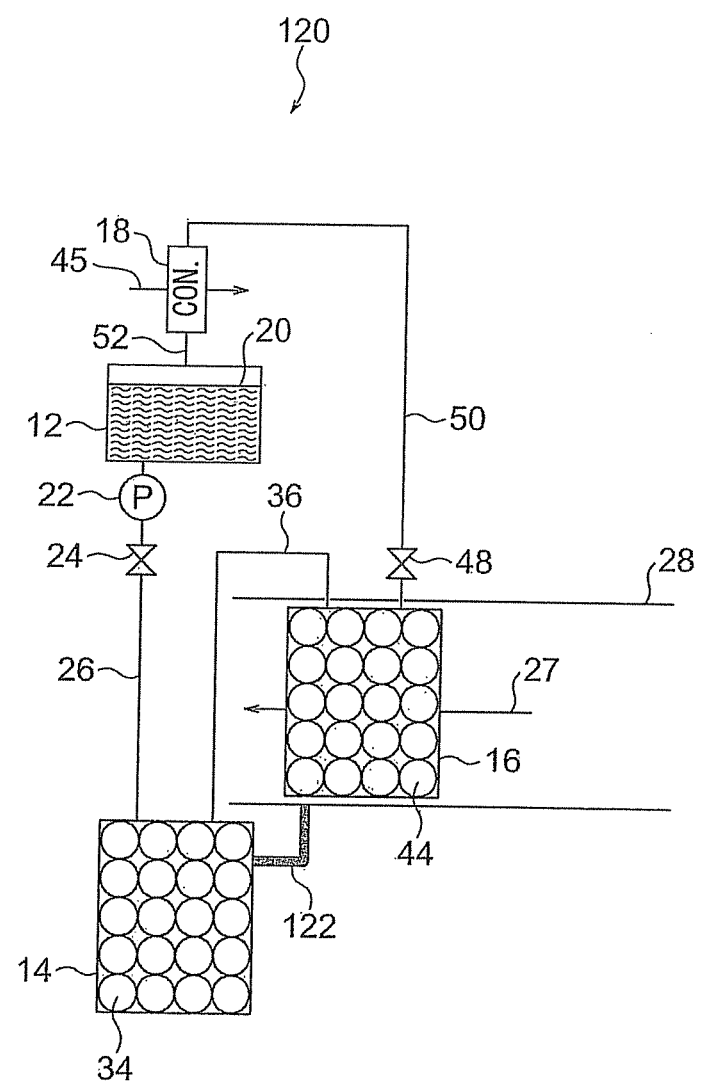
FIG. 17 is a diagram illustrating a schematic structure of a chemical heat accumulator according to an eighth embodiment.

As shown in FIG. 17, the first reaction vessel 14 is disposed outside of the exhaust pipe 28, and the second reaction vessel 16 is disposed inside of the exhaust pipe 28.

The first reaction vessel 14 is thermally connected to at least one of the second reaction vessel 16 and the exhaust pipe 28 through a heat conduction member 122.

The chemical heat storage material 34 of the first reaction vessel 14 is provided by a chemical heat storage material that is different from the chemical heat storage material 44 of the second reaction vessel 16 and has a dehydration temperature lower than that of the chemical heat storage material 44. For example, in a case where the chemical heat storage material 44 of the second reaction vessel 16 is provided by calcium oxide, and the chemical heat storage material 34 of the first reaction vessel 14 is provided by magnesium oxide.

Next, an operation and advantageous effects of the present embodiment will be described.

In the chemical heat accumulator 120 of the present embodiment, since the first reaction vessel 14 is disposed outside of the exhaust pipe 28, the pressure loss of the exhaust gas 27 can be reduced.

The first reaction vessel 14 is thermally connected to at least one of the second reaction vessel 16 and the exhaust pipe 28. Therefore, the heat required in the dehydration reaction of the first reaction vessel 14 can be supplied from at least one of the second reaction vessel 16 and the exhaust pipe 28.

The chemical heat storage material 34 of the first reaction vessel 14 is provided by a material that is different from the chemical heat storage material 44 of the second reaction vessel 16 and has the dehydration temperature lower than that of the chemical heat storage material 44. As such, even in a case where the amount of heat supplied to the first reaction vessel 14 is small due to the first reaction vessel 14 being disposed outside of the exhaust pipe 28, the dehydration reaction of the chemical heat storage material of the first reaction vessel 14 can be carried out.

While only the selected example embodiments have been chosen to illustrate the present disclosure, it will be apparent to those skilled in the art from this disclosure that various changes and modifications can be made therein without departing from the scope of the disclosure as defined in the appended claims. Further, the above described example embodiments may be suitably combined in various ways. Furthermore, the foregoing description of the example embodiments according to the present disclosure is provided for illustration only, and not for the purpose of limiting the disclosure as defined by the appended claims and their equivalents.

What is claimed is:

1. A chemical heat accumulator comprising:
a receptacle storing water;
a first reaction vessel being hermetically connected to the receptacle and being supplied with the water from the receptacle, the first reaction vessel containing a chemical compound therein that causes a hydration reaction with the water from the receptacle to generate water vapor by a heat of reaction, and causes a dehydration reaction by receiving heat; and
a second reaction vessel being hermetically connected to the first reaction vessel and being supplied with the water vapor from the first reaction vessel, the second reaction vessel containing a chemical heat storage material that generates heat by causing a hydration reaction with the water vapor from the first reaction vessel and stores heat through a dehydration reaction caused by receiving heat, the chemical heat storage material being thermally in contact with an object to be heated; and
a connection pipe connecting the first reaction vessel and the second reaction vessel to supply the water vapor from the first reaction vessel to the second reaction vessel; wherein
the second reaction vessel is one of a pair of second reaction vessels, and
the connection pipe connects the first reaction vessel to each of the pair of second reaction vessels,
the chemical heat accumulator further comprising
an on-off valve disposed on the connection pipe.

2. The chemical heat accumulator according to claim 1, further comprising:
a control unit configured to control the on-off valve to adjust at least one of an amount of the water vapor supplied from the first reaction vessel to each of the second reaction vessels and a timing to supply the water vapor from the first reaction vessel to each of the second reaction vessels.

3. The chemical heat accumulator according to claim 2, wherein
the pair of second reaction vessels is disposed in an exhaust pipe through which an exhaust gas from an engine flows such that one of the second reaction vessels is located upstream of the other with respect to a flow of the exhaust gas, the one being an upstream second reaction vessel and the other being a downstream second reaction vessel,
the first reaction vessel is disposed in the exhaust pipe downstream of the downstream second reaction vessel with respect to the flow of the exhaust gas,
each of the upstream and downstream second reaction vessels provides a gas passage therein to allow the exhaust gas to flow and supports the object to be heated in the gas passage, the object to be heated being a catalyst for purifying the exhaust gas, and
the control unit controls the on-off valve so that the water vapor is supplied from the first reaction vessel to the upstream second reaction vessel in an initial stage when the engine is started, and controls the on-off valve so that the water vapor is supplied from the first reaction vessel to the upstream second reaction vessel and the downstream second reaction vessel when a temperature of the chemical heat storage material of each of the upstream second reaction vessel and the downstream second reaction vessel is lower than an equilibrium temperature of the chemical heat storage material after the initial stage.

4. The chemical heat accumulator according to claim 2, further comprising:
an operation state detector configured to detect a discharge pressure and a rotational speed of the engine, wherein
the control unit controls the on-off valve so that the water vapor is supplied from the first reaction vessel to one of the second reaction vessels when it is determined that the engine is in a partial load state based on a detection result of the operation state detector, and controls the on-off valve so that the water vapor is supplied from the first reaction vessel to each of the second reaction vessels until a temperature of the chemical heat storage material of the respective second reaction vessel reaches an equilibrium temperature of the chemical heat storage material when it is determined that the engine is in a full load state based on the detection result.

5. The chemical heat accumulator according to claim 1, wherein the first reaction vessel is disposed in an exhaust pipe through which an exhaust gas from an engine flows, and the first reaction vessel provides a gas passage therein to allow the exhaust gas to flow, and supports a catalyst in the gas passage for purifying the exhaust gas.

6. The chemical heat accumulator according to claim 1, further comprising:

a condenser being hermetically connected to at least one of the first reaction vessel and the second reaction vessel, wherein the condenser is configured to receive the water vapor generated by the dehydration reaction from the one, to condense the water vapor therein to generate water, and to supply the water to the receptacle.

7. The chemical heat accumulator according to claim 1, wherein the second reaction vessel is separate from the first reaction vessel.

8. The chemical heat accumulator according to claim 7, further comprising a condenser disposed between the second reaction vessel and the receptacle storing water.

9. A chemical heat accumulator comprising:

a receptacle storing water;

a first reaction vessel being hermetically connected to the receptacle and being supplied with the water from the receptacle, the first reaction vessel containing a chemical compound therein that causes a hydration reaction with the water from the receptacle to generate water vapor by a heat of reaction, and causes a dehydration reaction by receiving heat; and a second reaction vessel being hermetically connected to the first reaction vessel and being supplied with the water vapor from the first reaction vessel, the second reaction vessel containing a chemical heat storage material that generates heat by causing a hydration reaction with the water vapor from the first reaction vessel and stores heat through a dehydration reaction caused by receiving heat, the chemical heat storage material being thermally in contact with an object to be heated;

a connection pipe connecting the first reaction vessel and the second reaction vessel to supply the water vapor from the first reaction vessel to the second reaction vessel;

a condenser, wherein the connection pipe respectively connects the first reaction vessel, the second reaction vessel and the condenser, the chemical heat accumulator further comprising an on-off valve being disposed on the pipe, the on-off valve being switched between a first state where the first reaction vessel is communicated with the second reaction vessel and a second state where the first reaction vessel is communicated with the condenser and the second reaction vessel is communicated with the condenser; and a control unit being configured to switch the on-off valve to the first state when the hydration reaction is carried out in the first reaction vessel and the second reaction vessel, and to the second state when the dehydration reaction is carried out in the first reaction vessel and the second reaction vessel.

10. A chemical heat accumulator comprising:

a receptacle storing water;

a first reaction vessel being hermetically connected to the receptacle and being supplied with the water from the receptacle, the first reaction vessel containing a chemical compound therein that causes a hydration reaction with the water from the receptacle to generate water vapor by a heat of reaction, and causes a dehydration reaction by receiving heat; and a second reaction vessel being hermetically connected to the first reaction vessel and being supplied with the water vapor from the first reaction vessel, the second reaction vessel containing a chemical heat storage material that generates heat by causing a hydration reaction with the water vapor from the first reaction vessel and stores heat through a dehydration reaction caused by receiving heat, the chemical heat storage material being thermally in contact with an object to be heated; and a connection pipe connecting the first reaction vessel and the second reaction vessel to supply the water vapor from the first reaction vessel to the second reaction vessel; wherein the second reaction vessel is disposed in an exhaust pipe through which an exhaust gas from an engine flows, the second reaction vessel provides a gas passage therein to allow the exhaust gas to flow and supports the object to be heated in the gas passage, the object to be heated being a catalyst for purifying the exhaust gas, the chemical heat accumulator further comprising:

a condenser;

a first pipe connecting the first reaction vessel to the condenser and being provided with a first flow rate control valve; and a second pipe connecting the second reaction vessel to the condenser and being provided with a second flow rate control valve.

11. The chemical heat accumulator according to claim 10, wherein the first reaction vessel is disposed downstream of the second reaction vessel in the exhaust pipe with respect to the flow of the exhaust gas, the chemical heat accumulator further comprising:

a control unit being configured to control the first flow rate control valve and the second flow rate control valve, wherein the control unit switches the first flow rate control valve to an open state and the second flow rate control valve to a closed state when the dehydration reaction is carried out in the first reaction vessel and the second reaction vessel.

12. The chemical heat accumulator according to claim 11, further comprising:

a reaction state detector being configured to detect one of a temperature and an internal pressure of the first reaction vessel and the second reaction vessel, wherein the control unit controls the first flow rate control valve and the second flow rate control valve so that the one of the temperature and the internal pressure is equal between the first reaction vessel and the second reaction vessel, based on a detection result of the reaction state detector.

13. A chemical heat accumulator comprising:

a receptacle storing water;

a first reaction vessel being hermetically connected to the receptacle and being supplied with the water from the receptacle, the first reaction vessel containing a chemical compound therein that causes a hydration reaction with the water from the receptacle to generate water vapor by a heat of reaction, and causes a dehydration reaction by receiving heat;

a second reaction vessel being hermetically connected to the first reaction vessel and being supplied with the water vapor from the first reaction vessel, the second reaction vessel containing a chemical heat storage material that generates heat by causing a hydration reaction with the water vapor from the first reaction vessel and stores heat through a dehydration reaction caused by receiving heat, the chemical heat storage material being thermally in contact with an object to be heated; and a distribution ratio control unit being disposed in the exhaust pipe upstream of the first reaction vessel and the second reaction vessel with respect to the flow of exhaust gas, wherein the first reaction vessel and the second reaction vessel are disposed in an exhaust pipe through which an exhaust gas from an engine flows, and arranged on a same plane defined perpendicular to a longitudinal axis of the exhaust pipe, and the distribution ratio control unit is configured to control a ratio of a flow rate of the exhaust gas introduced to the first reaction vessel and a flow rate of the exhaust gas introduced to the second reaction vessel.

14. The chemical heat accumulator according to claim 13, wherein the first reaction vessel is arranged under the second reaction vessel with respect to a direction of gravity, and the first reaction vessel and the second reaction vessel are in communication with each other through a communication channel that extends in the direction of gravity between the first reaction vessel and the second reaction vessel.

15. The chemical heat accumulator according to claim 13, wherein the first reaction vessel and the second reaction vessel are coaxially arranged in the exhaust pipe.

16. The chemical heat accumulator according to claim 13, further comprising:

a gas temperature detector that detects a temperature of the exhaust gas; and a control unit being configured to control the distribution ratio control unit so that the flow rate of the exhaust gas introduced to the second reaction vessel is greater than the flow rate of the exhaust gas introduced to the first reaction vessel when a detection value of the gas temperature detector is lower than a predetermined value.

17. A chemical heat accumulator comprising:

a receptacle storing water;

a first reaction vessel being hermetically connected to the receptacle and being supplied with the water from the receptacle, the first reaction vessel containing a chemical compound therein that causes a hydration reaction with the water from the receptacle to generate water vapor by a heat of reaction, and causes a dehydration reaction by receiving heat; and a second reaction vessel being hermetically connected to the first reaction vessel and being supplied with the water vapor from the first reaction vessel, the second reaction vessel containing a chemical heat storage material that generates heat by causing a hydration reaction with the water vapor from the first reaction vessel and stores heat through a dehydration reaction caused by receiving heat, the chemical heat storage material being thermally in contact with an object to be heated; and a connection pipe connecting the first reaction vessel and the second reaction vessel to supply the water vapor from the first reaction vessel to the second reaction vessel; wherein the first reaction vessel is disposed outside of an exhaust pipe through which an exhaust gas from an engine flows, and the second reaction vessel is disposed inside of the exhaust pipe.

18. The chemical heat accumulator according to claim 17, wherein the first reaction vessel is thermally connected to at least one of the second reaction vessel and the exhaust pipe.

19. The chemical heat accumulator according to claim 17, wherein the chemical compound includes a chemical heat storage material that is different from the chemical heat storage material of the second reaction vessel and has a dehydration temperature lower than that of the chemical heat storage material of the second reaction vessel.

* * * * *